United States Patent [19]

Fiala

[11] 4,173,887
[45] Nov. 13, 1979

[54] APPARATUS INCLUDING A METER FOR INDICATING THE FUEL CONSUMPTION RATE OF AN INTERNAL COMBUSTION ENGINE

[75] Inventor: Ernst Fiala, Wolfsburg

[73] Assignee: Volkswagenwerk Aktiengesellschaft, Wolfsburg, Fed. Rep. of Germany

[21] Appl. No.: 920,536

[22] Filed: Jun. 29, 1978

[30] Foreign Application Priority Data

Jul. 13, 1977 [DE] Fed. Rep. of Germany ....... 2731545

[51] Int. Cl.² .............................................. G01F 9/00
[52] U.S. Cl. .................................................... 73/114
[58] Field of Search .............. 73/114, 113, 116, 119 A

[56] References Cited

U.S. PATENT DOCUMENTS

| 2,894,252 | 7/1959 | Lawhorn et al. ................ 73/116 UX |
| 3,916,682 | 11/1975 | Garcea .................................. 73/114 |

*Primary Examiner*—Jerry W. Myracle
*Attorney, Agent, or Firm*—Brumbaugh, Graves, Donohue & Raymond

[57] ABSTRACT

A device for indicating the fuel consumption rate of an internal combustion engine. The device includes a potentiometer having a sliding contact engaging a variable resistor portion to provide variable resistance between the contact and an output lead of the potentiometer. The sliding contact is mechanically connected to the engine throttle for adjusting the position of the contact such that the resistance between the contact and the output lead increases as the amount of fuel supplied to the engine increases. A meter for indicating the fuel consumption rate is included in an electrical circuit including, in series, a voltage source, the meter, and the potentiometer connected at the contact and the output lead. Circuit interrupting means are also provided to open the electrical circuit only when the throttle is in the idling position.

8 Claims, 2 Drawing Figures

Fig.2

APPARATUS INCLUDING A METER FOR INDICATING THE FUEL CONSUMPTION RATE OF AN INTERNAL COMBUSTION ENGINE

BACKGROUND OF THE INVENTION

The invention relates to a device for indicating the fuel consumption rate of an internal combustion engine. Devices of these types are known. For example, German Public Disclosure (DOS) No. 24 40 398, G01F, 9/00 discloses a device for indicating the fuel consumption rate where the sliding contact of a variable resistor potentiometer is mechanically linked to the injection pump control rod of the fuel injection apparatus of the engine, and which includes a resistor whose resistance varies as a function of the engine speed.

Such devices of this type may also be used in carburetor engines, where the sliding contact of the potentiometer is linked mechanically to the throttle in the intake manifold of the engine, or as shown in German Public Disclosure (DOS) No. 23 57 770, G01F, 29/02, to the gas pedal.

SUMMARY OF THE INVENTION

The present invention is a device for indicating the fuel consumption rate of an internal combustion engine which requires a minimum of electrical and/or electronic components and delivers at least a qualitative indication of the fuel consumption rate for all relevant operating modes of the engine. The indicator can either be an instrument gauge or any other device furnishing an acoustic or optical signal at least when certain fuel consumption rates occur.

More particularly, the device includes a potentiometer having a sliding contact engaging a resistor portion for providing a variable resistance between the contact and an output lead of the potentiometer. The sliding contact is mechanically connected to the engine fuel proportioning device, such as the throttle, for adjusting the position of the contact such that the resistance between the contact and the output lead increases as the amount of fuel supplied to the engine increases. The fuel consumption rate is indicated on an instrument gauge which is in series with a voltage source and the potentiometer which is connected at the sliding contact and output lead. A circuit interrupting means is also provided to open the electrical circuit only when the fuel proportioning means is in the idling position and thereby indicate a high fuel consumption rate.

A device of this type will thus indicate a different fuel consumption rate when the engine and automobile are in the idling mode with the vehicle stationary than when the vehicle is decelerating, even though in both cases the throttle position will be the same, i.e. closed, since the circuit will be interrupted, for example in response to a signal depending upon rotational speed or velocity, when the engine and automobile are in the idling mode, and thus display a higher fuel consumption rate than in the case when the automobile is decelerating. When the signal used is dependent upon engine speed, the device may be arranged so that the switch is opened, for example, at speeds less than double the idling speed of the engine, whereas at higher speeds it remains closed. Correspondingly, when a signal depending upon the velocity of the automobile is used, the device is designed so that the switch is opened at speeds below some appropriate minimum, for example 30 kilometers per hour. At speeds below the predetermined level, i.e. the idling mode, the fuel rate circuit will be open and the fuel rate indicator will indicate a high fuel consumption rate, whereas at higher road speeds, even though the fuel throttle will still be closed, the circuit switch will be closed, and thus the indicator will indicate a low fuel consumption rate.

The production of a signal depending upon speed or velocity is known in the art. For example, a signal depending upon road speed can be mechanically or inductively derived from the speedometer. A signal depending upon the engine speed may be obtained, for example, by the generator voltage. Alternatively, the pressure in the intake manifold of the engine may be measured to generate an actuating signal for the switch, the signal derived being lower in the deceleration mode than when the engine is idling.

BRIEF DESCRIPTION OF THE DRAWINGS

For a better understanding of the invention, reference is made to the following detailed description of embodiments of the invention, taken in conjunction with the accompanying drawing in which.

DETAILED DESCRIPTION OF THE PREFERRED EMBODIMENTS

Figure 1:
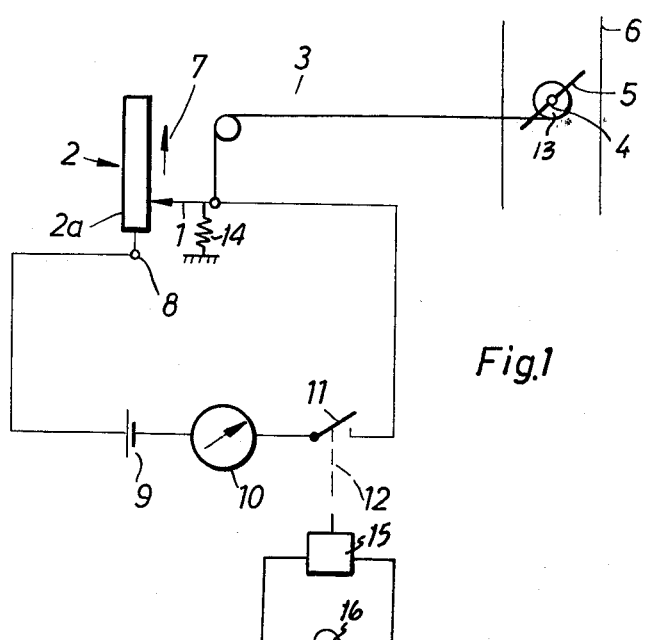
FIG. 1 is a schematic circuit diagram illustrating one form of apparatus for indicating the fuel consumption rate of an internal combustion engine according to the invention.

Referring to FIG. 1, a potentiometer 2 is shown having a sliding contact 1 engaging a resistor portion 2a, the contact 1 also being mechanically linked to the shaft 4 of a throttle 5 in the intake manifold 6 of the engine, not shown. The linkage is arranged such that the sliding contact 1 moves away, as indicated by arrow 7, from an output lead 8 of a resistor portion 2a of the potentiometer as the throttle 5 is further opened. In other words, the distance across the potentiometer from the sliding contact 1 to the output lead 8 will be increased as the throttle opening increases. When the throttle 5 is in closed position (idling), the sliding contact 1 will be positioned at the end of the resistor portion 2a coincident with the output lead 8, so that the resistance across the potentiometer will be very small.

The sliding contact 1 is coupled to throttle 5 by a wire 3, the wire 3 being attached at one end to the contact 1 and at the other end to a pulley 13 attached to the throttle pivot shaft 4. A spring 14 is also attached to the contact 1 and wire 3 to maintain tension in the wire 3.

The potentiometer 2 forms part of an electrical circuit having, in series, a switch 11, an instrument gauge 10 in the form of an ammeter, and a voltage source 9. The position of the switch 11 is controlled, as indicated by line 12, according to the rotational speed of the engine or by the speed of the vehicle such that the switch 11 is open only when the vehicle is stationary, or proceeding very slowly, or within a range of engine speeds representing the approximate idling mode of the engine. At higher road speeds, for example above 30 kilometers per hour, or at higher engine speeds, for example above double the idling speed of the engine, the switch 11 will be closed; thus in the deceleration mode, since the throttle will be closed and the resistance across the potentiometer will be small, a comparatively large current will pass through the circuit, producing a low fuel consumption reading on the gauge 10. The gauge 10 accordingly has an inversely graduated scale, so that it indicates a low fuel consumption rate at higher currents, and conversely a higher fuel consumption rate at lower currents (i.e. when the throttle is open and thus the resistance across the potentiometer 2 is high, or when the engine is idling and thus the circuit switch 11 is open).

As shown in FIG. 1, the switch 11 may be a contact of a relay 15 actuated by a tachometer generator 16. The drive shaft of the tachometer generator 16 is driven in a conventional manner by the engine, with its rotational speed increasing with higher engine rpm.

Figure 2:
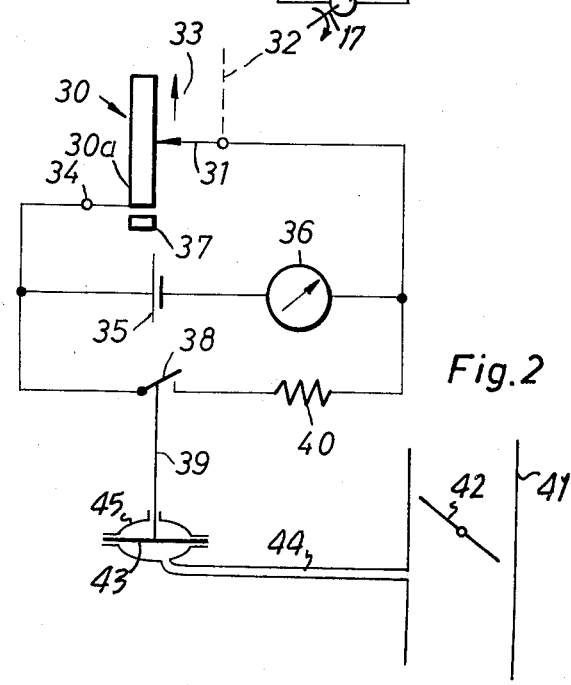
FIG. 2 is a schematic circuit diagram illustrating another form of apparatus for indicating the fuel consumption rate of an internal combustion engine according to the invention.

In the embodiment shown in FIG. 2, a potentiometer 30 also has a sliding contact 31 mechanically linked as indicated by line 32 to the throttle (not shown), or in the case of an engine having a fuel injection device, to the injection pump control rod (not shown). The linkage is again arranged so that as engine load increases (the throttle is opened), the sliding contact 31 is moved away, as indicated by arrow 33, from the output lead 34 of a resistor portion 30a, increasing the resistance across the potentiometer between the contact 1 and the output lead 8.

In this embodiment, the electrical circuit is similar to that described in connection with FIG. 1, and contains a voltage source 35 and an instrument gauge 36 in the form of an ammeter. The circuit interrupting means, however, will be contained in the potentiometer 30 itself. The potentiometer 30 is provided with a separate portion 37, which is insulated, and which will be engaged by the sliding contact 33 when the throttle is in the closed position, i.e. during the idling mode or deceleration mode of the engine. Thus, when the throttle is closed, the sliding contact 33 will engage the separate portion 37, and open the circuit.

In order to distinguish between the idling and deceleration mode, since the circuit will be open in either case, a second electrical circuit is connected in parallel with the potentiometer 30. The second circuit will include a second switch 38 and a second resistor 40. This switch 38, which is controlled as indicated by the line 39, is open only at engine speeds in the idling range or at low road speeds, depending upon the indicator signal chosen. When the engine is in the deceleration mode, however, as will be indicated by higher engine speeds, higher vehicle velocity, or lower intake manifold pressures than true idling, the second switch 38 will be closed forming a completed circuit through the voltage source 35, second resistor 40 and indicator gauge 36. Thus, with the throttle in the closed position, if the vehicle is also in the decelerating mode, switch 38 will be closed and current will flow through the instrument gauge 36 indicating a lower fuel consumption rate, whereas for true idling both circuits will be interrupted and the gauge 36 will indicate a high fuel consumption rate.

In the embodiment shown in FIG. 2, the position of the switch 38 is controlled by the intake manifold pressure. A vacuum line 44, tapped into the intake manifold 41 in the vicinity of the throttle 42, is connected to one side of a piston diaphragm housing 45. The diaphragm 43 is coupled to the switch 38 by a pin 39. Thus, with decreasing manifold pressure, the diaphragm 43 and pin 39 will cause the switch 38 to be moved towards its closed position.

The foregoing represent the preferred embodiments of the invention, and various modifications will be apparent to those skilled in the art. All such variations and modifications are intended to be within the scope of the invention, as contained in the following claims.

I claim:

1. A device for indicating the fuel consumption rate of an internal combustion engine comprising:
   (a) potentiometer means having a sliding contact engaging resistance means for providing variable resistance between said contact and an output lead of said potentiometer;
   (b) means connecting said sliding contact with the fuel proportioning means of the engine for adjusting the position of said contact such that the resistance between said contact and said output lead increases as the amount of fuel supplied to the engine increases;
   (c) electrical circuit means comprising, in series, a voltage source, a meter responsive to the current in said circuit for indicating fuel consumption rate, said potentiometer means connected at said contact and said output lead, and circuit interrupting means; and
   (d) means for actuating said circuit interrupting means to open said electrical circuit only when the fuel proportioning means is in the idling position.

2. A device according to claim 1, wherein said circuit interrupting means comprises a switch, and said means for actuating said circuit interrupting means is actuated by a signal representative of the engine speed.

3. A device according to claim 1 for use in a vehicle, wherein said circuit interrupting means comprises a switch, and where said means for actuating said circuit interrupting means is operable in response to a signal representative of the vehicle speed for opening said switch when the vehicle speed is approximately zero.

4. A device according to claim 1, wherein said potentiometer means has a resistance portion engaged by said contact when said engine is operating in partial to full load, and said circuit interrupting means comprises a separate isolated portion of said potentiometer means engaged by said siding contact when said engine is in the idling or deceleration mode.

5. A device according to claim 4, further comprising a second circuit including, in series, a second resistance means and a second circuit interrupting means, said second circuit connected in parallel with said linear resistance portion of said potentiometer means, and means for actuating said second circuit interrupting means to open said second circuit only when the engine is operating at idling speed.

6. A device according to claim 5, wherein said second circuit interrupting means is actuated by a signal representative of the engine speed.

7. A device according to claim 5 for use in a vehicle, wherein said second circuit interrupting means is operable in response to a signal representative of the speed of the vehicle for opening said second circuit when the vehicle speed is approximately zero.

8. A device according to claim 7, wherein said signal is representative of the pressure in the intake manifold of said engine for opening said second circuit at higher intake manifold pressures.

* * * * *